United States Patent [19]

Sangster et al.

[11] 3,824,337

[45] July 16, 1974

[54] SENSOR FOR CONVERTING A PHYSICAL PATTERN INTO AN ELECTRICAL SIGNAL AS A FUNCTION OF TIME

[75] Inventors: Frederik Leonard John Sangster; Hendrik Heijns, both of Emmasingel, Eindhoven, Netherlands

[73] Assignee: U.S. Philips Corporation, New York, N.Y.

[22] Filed: July 20, 1973

[21] Appl. No.: 381,016

Related U.S. Application Data

[63] Continuation of Ser. No. 232,561, March 7, 1972, abandoned.

[52] U.S. Cl..... 178/7.1, 250/220 M, 340/146.3 MA

[51] Int. Cl. .............................................. H04n 3/16

[58] Field of Search................. 178/7.1; 250/220 M; 340/146.3 MA

[56] References Cited

UNITED STATES PATENTS

| | | | |
|---|---|---|---|
| 3,142,824 | 7/1964 | Hill | 340/146.3 MA X |
| 3,303,466 | 2/1967 | Holt | 340/146.3 MA |
| 3,562,418 | 2/1971 | Glusik et al. | 178/7.1 X |
| 3,603,731 | 9/1971 | Weimer | 178/7.1 R |
| 3,621,283 | 11/1971 | Teer et al. | 178/7.1 X |
| 3,679,826 | 7/1972 | Crowell | 178/7.1 R |
| 3,683,193 | 8/1972 | Weimer | 250/220 M X |

*Primary Examiner*—Paul J. Henon
*Assistant Examiner*—Melvin B. Chapnick
*Attorney, Agent, or Firm*—Frank R. Trifari; Simon L. Cohen

[57] ABSTRACT

A sensor for television, formed with converter elements integrated in a semiconductor body. The converter elements are divided into sensor elements for picking up the information originating from a physical pattern such as, for example, a scene and converting the information into an electrical charge pattern. The information from the sensor elements is passed to converter elements in the form of storage elements at a low-frequency during the field blanking period. Part of the information is passed to converter elements of a parallel-series converter during the field blanking period. The information from the storage elements is passed on line by line during the line blanking period to the parallel-series converter and is read out at a high frequency during the line scan period.

7 Claims, 3 Drawing Figures

SENSOR FOR CONVERTING A PHYSICAL PATTERN INTO AN ELECTRICAL SIGNAL AS A FUNCTION OF TIME

This is a continuation of application Ser. No. 232,561, filed Mar. 7, 1972, now-abandoned.

BACKGROUND OF THE INVENTION

The invention relates to a sensor for converting a physical pattern into an electrical signal as a function of time. The sensor comprises converter elements arranged in a row and each formed with at least one capacitor and a control electrode. The physical pattern determines the charge of a capacitor charged to a reference voltage. The charge is transferred consecutively to other capacitors with the aid of the control electrodes connected to a switching voltage source and appears as picked-up pattern information at the output of the sensor.

DESCRIPTION OF THE PRIOR ART

Such a sensor is described in French Pat. specification No. 2006763 corresponding to U.S. Pat. No. 3,621,283, issued Nov. 16, 1971, reissue filed Jan. 5, 1973, Ser. No. 321,352. In this Specification a row of converter elements is built up from seriesarranged sensor elements on which the information of the physical pattern acts in the form of light, pressure etc. Subsequently the row is read out in series through an output switch with the aid of the switching voltage source. Thus the information picked up by a sensor element is passed on during reading out to the output of the sensor by the other elements. The sensor elements therefore perform a dual task, on the one hand the conversion of the information of the physical pattern into a voltage across the capacitors and on the other hand the shift of this information to the output of the sensor. To prevent the continuous sensing of information during reading out from noticeably influencing the voltages across the capacitors, i.e. to avoid crosstalk, the read period is to be many times shorter, for example, 10 to 100 times shorter than the effective pick-up period. The shortest read period of the sensor is determined by the number of elements in series and by the maximum switching frequency of semiconductors incorporated in the elements and active as switches between the capacitors. The requirement that the pick-up period must be many times longer in one cycle than the read period may lead to an inadmissibly long pick-up period.

As an example for a maximum switching frequency of 2 MHz of the semiconductors, (for example, MOS transistors) in a sensor including 64 elements in series the read period is $64 \times 0.5\ \mu s = 32\ \mu s$ so that the pick up period must be at least approximately 1 ms if crosstalk is to be within acceptable limits. This pickup period is inadmissibly long when the sensor would be used for character recognition in a computer in which a cycle period of 50 $\mu s$ may be required.

For television purposes the above-mentioned application describes a sensor panel which is composed of rows of series-arranged converter or sensor elements. One row of series-arranged sensor elements corresponds to the line scanning commonly used for television and is effected field by field. Alternately the rows of sensor elements are read out to one output capacitor in the output stage with the aid of a shift register through output switches.

An embodiment of the sensor panel employing MOS transistors as semiconductor switches integrated in a semiconductor body has a compact structure and a simple control, but due to the dual function of the converter elements contradictory requirements may be imposed on the size of each element. In order to have a sensor element correspond to a normal television spot upon display, the size of this element is to be at a minimum which is also attractive for reasons of technology. On the other hand a desired high read frequency imposes its own requirements on the dimensions of the MOS transistors which therefore cannot be at a minimum. Dependent on the number of television lines desired, for example, in accordance with a given television standard, i.e. rows of sensor elements, the surface of the panel may become considerably large.

In that case it is also desirable to form the shift register. Although the shift register switches only at the line frequency, it would occupy an equally large surface in a practical embodiment as the sensor panel.

It is found that the rows of sensor elements are alternately connected to the output capacitor through the output switches formed as MOS transistors. However, parasitic capacitances are present across the output switches as given by an overlapping of gate and drain electrodes of the MOS transistor and substrate capacitances so that the output signal of the sensor may be considerably attenuated.

SUMMARY OF THE INVENTION

It is an object of the present invention to provide a sensor which is active with a minimum amount of crosstalk without the problem of the read-pick up time ratio. The sensor can be formed with a small surface in an integrated embodiment and provides a very satisfactory output signal which is attenuated to a minimum by possible parasitic capacitances. Accordingly the sensor according to the invention is characterized in that the converter elements are partly formed as sensor elements including capacitors which pick up the pattern information and are formed with series-arranged elements incorporated in a parallel-series converter. The sensor elements are connected in parallel with the series-arranged elements. The control electrodes of the parallel-series converter connected to the output of the sensor are connected to a high-frequency switching voltage source. The control electrodes of the sensor elements are connected to a switching voltage source of lower frequency.

A separation between functions has been achieved so that both the sensor elements and the parallel-series converter elements can be formed for their specific tasks in the most favorable manner.

According to the invention a sensor formed as a two-dimensionally operating sensor panel is furthermore characterized in that rows of series-arranged sensor elements are provided in columns while rows of series-arranged converter elements operative as storage elements are provided between the sensor elements and the parallel-series converter elements in the said converter. The converter elements constitute a store whose control electrodes are connected to the said switching voltage source of lower frequency.

In order that the invention may be readily carried into effect, some embodiments thereof will now be described in detail by way of example with reference to the accompanying diagrammatic drawings in which

BRIEF DESCRIPTION OF THE DRAWINGS

FIG. 1 shows a sensor according to the invention suitable for television and being formed with a sensor panel P. The sensor panel P is formed with four rows of four series-arranged sensor elements $P_{11}$, $P_{21}$, $P_{31}$, $P_{41}$; $P_{12}$, $P_{22}$, $P_{32}$, $P_{42}$; $P_{13}$ . . . $P_{43}$ and $P_{14}$ . . . $P_{44}$ which are provided in columns. The sensor elements $P_{11}$, $P_{12}$, $P_{13}$ and $P_{14}$ correspond to the spots in a line of horizontal scanning commonly used in television. For the sake of simplicity of FIG. 1 it has been assumed that four lines each having four sensor elements $P_{11}$ . . . $P_{14}$; $P_{21}$ . . . $P_{24}$; $P_{31}$ . . . $P_{34}$ and $P_{41}$ . . . $P_{44}$ as spots constitute a raster occurring in television. The sensor panel is thus shown with 4 by 4 sensor elements $P_{11}$ . . . $P_{44}$ instead of the commonly used number in television of 525 by 525 or 625 by 625 which is principally unimportant.

Figure 1:
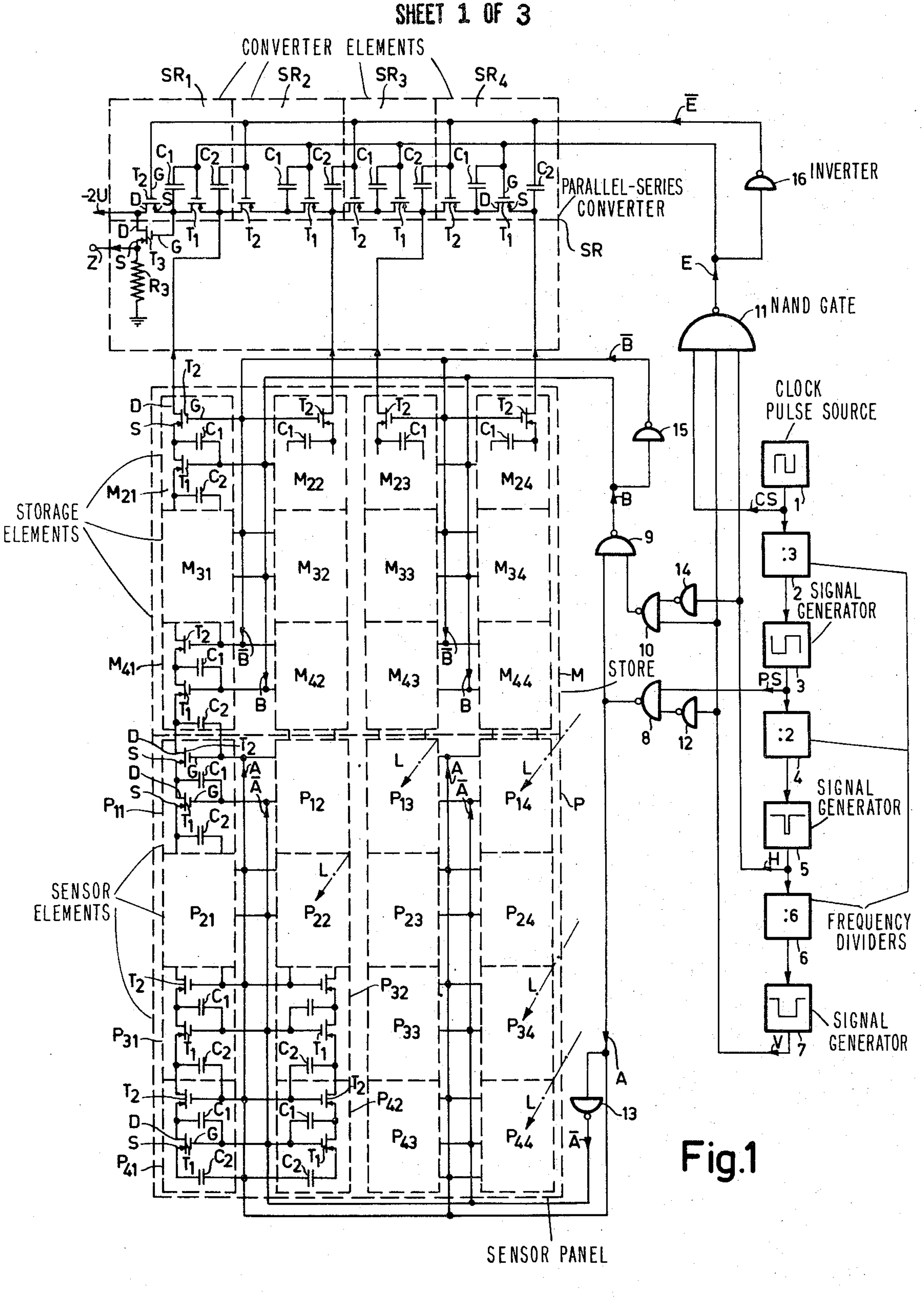
FIG. 1 shows a switching circuit diagram of a sensor according to the invention.

The sensor panel P is connected to a store M. The sensor elements $P_{11}$, $P_{12}$, $P_{13}$ and $P_{14}$ which constitute the first line are connected to storage elements $M_{41}$, $M_{42}$, $M_{43}$ and $M_{44}$ of the store M which elements are active as storage elements and which form part of a row of three series-arranged elements $M_{21}$, $M_{31}$, $M_{41}$; $M_{22}$, $M_{32}$, $M_{42}$; $M_{23}$, $M_{33}$, $M_{43}$ and $M_{24}$, $M_{34}$, $M_{44}$. Each row of storage elements $M_{21}$, $M_{31}$, $M_{41}$ etc. has one element less than the row of sensor elements $P_{11}$, $P_{21}$, $P_{31}$, $P_{41}$ etc. connected thereto. The storage elements $M_{21}$, $M_{22}$, $M_{23}$ and $M_{24}$ are connected to series-arranged converter elements $SR_1$, $SR_2$, $SR_3$ and $SR_4$ incorporated in a parallel-series converter SR. The parallel-series converter SR active as a shift register is formed with an output transistor $T_3$ connected to the element $SR_1$.

The converter elements $P_{11}$ . . . $P_{44}$ of the sensor panel P, $M_{21}$ . . . $M_{44}$ of the store M and $SR_1$ . . . $SR_4$ of the parallel-series converter SR are more or less formed in accordance with an identical switching diagram. Each converter element with, for example, $P_{11}$ is formed with two semiconductors $T_1$ and $T_2$ shown as MOS transistors and with two capacitors $C_1$ and $C_2$ of the same value. The MOS transistors $T_1$ and $T_2$ of the p-channel type are formed with a control or gate electrode G, a source electrode S and a drain electrode D. The drain electrode D of transistor $T_1$ is connected to the source electrode S of transistor $T_2$ and, through capacitor $C_1$, to the gate electrode G of transistor $T_1$. The source electrode S of transistor $T_1$ of element $P_{11}$ is connected directly and through the capacitor $C_2$ to different connection points of the element $P_{21}$ . Connection points of the element $P_{11}$ which are analogous thereto and which are connected to the element $M_{41}$ are connected in the element $P_{11}$ to the drain electrode D and the gate electrode G of transistor $T_2$. The gate electrodes G of transistors $T_1$ and $T_2$ are connected to control leads in which for element $P_{11}$ signals inversely occurring are indicated by means of $\bar{A}$ and A. Control signals for the transistors $T_1$ and $T_2$ in the store M are indicated by B and $\bar{B}$ and by E and $\bar{E}$ for the converter SR.

The elements $P_{41}$, $P_{42}$, $P_{43}$, $P_{44}$ and $SR_4$ are shown to be slightly deviating and the source electrode S of transistor $T_1$ is connected through capacitor $C_2$ only to the lead with the control signals A and E. The source electrodes S of the transistor $T_2$ in element $SR_1$ is connected to the gate electrode G of output transistor $T_3$. The drain electrode D of transistor $T_3$ and transistor $T_2$ ($SR_1$) are connected to a terminal providing a voltage −2U from a supply source not further shown while a further terminal thereof is assumed to be connected to ground. The source electrode S of transistor $T_3$ is connected to ground through a resistor $R_3$ and is connected to a terminal Z which serves as an output terminal for the sensor according to FIG. 1.

Although the elements $P_{11}$ . . . $P_{44}$, $M_{21}$ . . . $M_{44}$ and $SR_1$ . . . $SR_4$ more or less have the same structure, the elements $P_{11}$ . . . $P_{44}$ have an extra property in that they are photosensitive. Chain-link lines denoted by the reference L indicate the light which is projected onto the sensor elements $P_{11}$ . . . $P_{44}$ and which originates from a scene to be picked up. The light L is incident on the capacitors $C_1$ and $C_2$ charged to a reference voltage in the sensor elements $P_{11}$ . . . $P_{44}$, which capacitors are photosensitive and are discharged under the influence of the local light intensity. When the elements $M_{21}$ . . . $M_{44}$ are formed in an identical manner with capacitors $C_1$ and $C_2$ having photosensitive properties, the store M is assumed to be covered with a layer which is impermeable to light so that the light L is not incident on the elements $M_{21}$ . . . $M_{44}$.

The operation of the sensor according to FIG. 1 will be described in conjunction with the signals shown as a function of time in FIG. 2. A logical 1 and 0 have been plotted for the signal as well as partly corresponding voltages oV (ground) and −U which may be, for example, −6 Volts.

In FIG. 1 the reference numeral 1 denotes a clock pulse source which provides clock pulses CS. The clock pulse source 1 is connected through a frequency divider 2 to a signal generator 3 which provides a signal PS. The generator 3 is connected through a frequency divider 4 to a signal generator 5 which provides a signal H. Generator 5 is connected through a frequency divider 6 to a signal generator 7 which provides a signal V.

Figure 2:
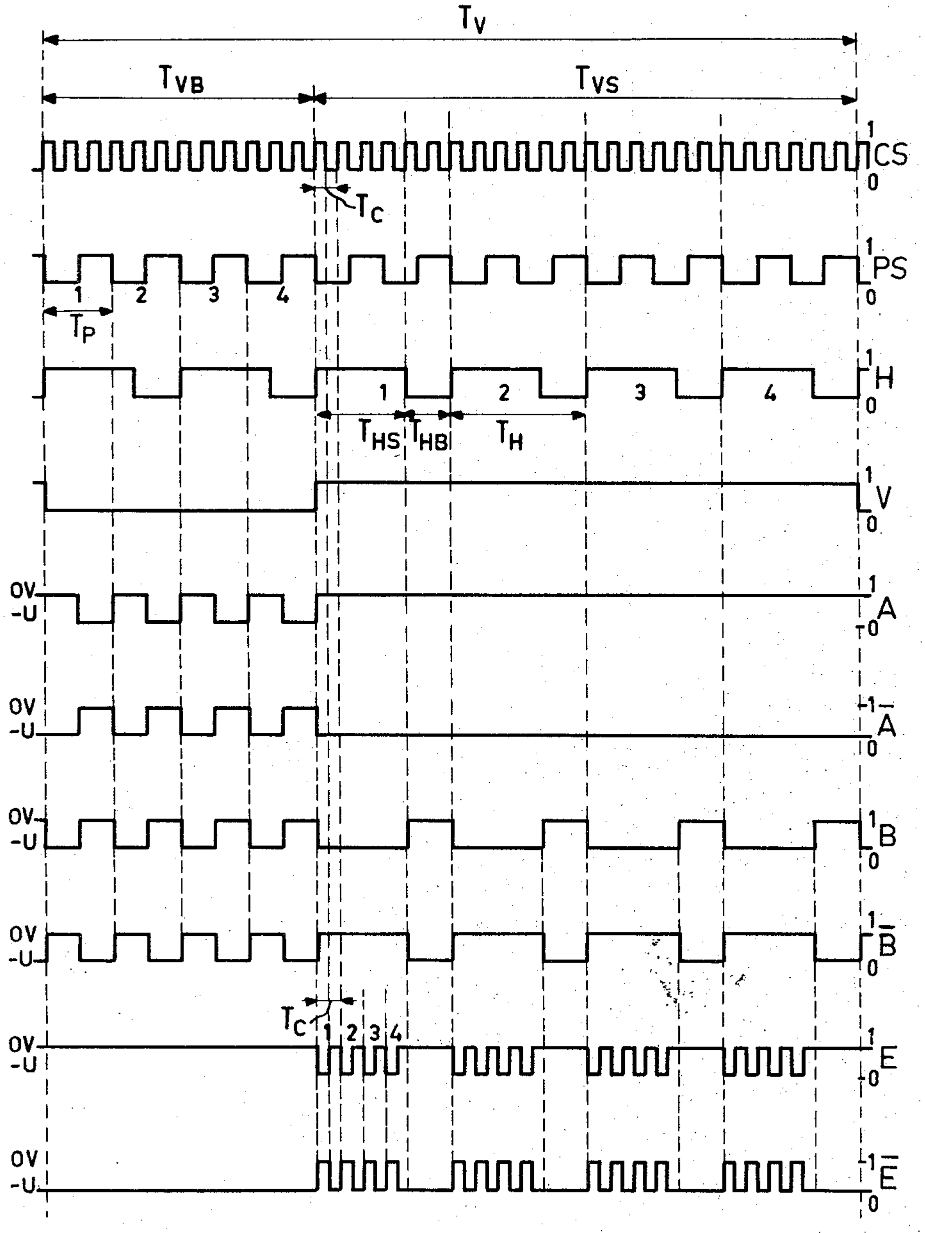
FIG. 2 shows as a function of time some signals occurring in the sensor according to FIG. 1, FIG. 3 diagrammatically shows an embodiment of a sensor integrated in a semiconductor body.

The clock pulses CS having a repetition period $T_C$ and the signals PS, H and V derived therefrom through dividers 2, 4 and 6 are shown in FIG. 2 over approximately a time duration $P_V$. The duration $T_V$ is assumed to be the field period commonly used in television which is subdivided into a field scan period $T_{VS}$ and a field blanking period $T_{VB}$. For signal H duration $T_H$ denotes a line period which is subdivided into a line scan period $T_{HS}$ and a line blanking period $T_{HB}$. Starting from the sensor panel P shown in FIG. 1 with 4 by 4 sensor elements $P_{11}$ . . . $P_{44}$ it follows that $T_{VS} = 4\ T_H$. The field blanking period $T_{VB}$ is chosen to last two line periods $T_H$ while the signal PS with four periods denoted by $T_p$ occurs therein. It follows that the dividers 2, 4 and 6 are a three-to-one, a two-to-one and a six-to-one divider, respectively. Instead of the series arrangement with the components 1 to 7, generators 5 and 7 may alternatively be connected through a six-to-one divider and a thirty-six-to-one divider directly to the source 1. Since the signals H and V exhibit a pulse having a repetition period, the said dividers are formed asymmetrically.

The clock pulses CS and the signals PS, H and V provide the control signals A, B and E and the inverse values thereof through NAND-gates 8 to 11 inclusive and inverters 12 to 16 inclusive. For the NAND-gates 8 . .

. 11 there applies that these provide only a logical 0 if a logical 1 occurs at all inputs. It follows from the given rule that the gate 8 which is directly connected to the generator 3 with the signal PS of FIG. 2 and through the inverter 12 to generator 7 with the signal $\bar{V}$ provides the signal A shown in FIG. 2. The signal $\bar{A}$ is obtained through the inverter 13.

The signal A is used to generate part of the signal B and to this end it is applied to an input of gate 9. Another input of gate 9 is connected to the output of gate 10, an input of which is directly connected to the generator 7 and through the inverter 14 to the generator 5. It follows that during the period $T_{VB}$ of FIG. 2 the gate 10 provides the logical 1 under the influence of the logical 0 in the signal V so that the signal A appears inverted in the signal B. During the period $T_{VS}$ the signals A and V enable gates 9 and 10, respectively, with the logical 1 and signal H appears inverted in the signal B. Gate 9 provides the signal $\bar{B}$ through the inverter 15.

Inputs of the NAND-gate 11 are directly connected to the source 1 and the generators 5 and 7 are connected to the respective clock pulses CS and the signals H and V. The signals V and H cut off the gate 11 with the logical 0 during the period $T_{VB}$ and the periods $T_{HB}$, respectively, during the period $T_{VS}$. In the periods $T_{HS}$ during the period $T_{VS}$ the signals H and V enable the gate 11 with the logical 1 so that this gate conveys the inverted clock pulses CS at the output in the signal E. The gate 11 provides the signal $\bar{E}$ through the inverter 16.

Three switching voltage sources are obtained in this manner, namely a high-frequency switching voltage source (1,11) which provides a portion of the signal E, a source (3,8,12) of lower frequency which provides a portion of the signals A and B and a line-frequency source (5,9,10,14) which provides a portion of the signal B.

To explain the operation of the sensor according to FIG. 1 we start from an initial condition in which the element $SR_1$ is connected to the voltage –2U. The signal $\bar{E}$ causes by means of voltage –U the transistor $T_2$ ($SR_1$) to conduct so that capacitor $C_1$ is charged to the voltage –U because the ground potential oV is present in the signal E. Subsequently, signal E causes by means of voltage –U the transistor $T_1$ ($SR_1$) to conduct, while $T_2$ ($SR_1$) is cut off under the influence of the ground potential oV. The result is that the capacitor $C_2$ which is of the same value as $C_1$ takes over the charge and is charged to the –U voltage. A subsequent –U voltage in the signal –E causes the capacitor $C_1$ ($SR_1$) to be charged again to the voltage –U and causes the capacitor $C_2$ ($SR_1$) to transfer the charge to the capacitor $C_1$ ($SR_2$). It is found that from the initial condition the high-frequency clock pulses CS occurring in the signal E during the period $T_{HS}$ ($T_{VS}$) charge the capacitors $C_1$ and $C_2$ in the converter SR to the voltage –U which voltage –U serves as a reference voltage.

Under the control of the signal $\bar{B}$ the elements $M_{21}$, $M_{22}$, $M_{23}$ and $M_{24}$ are connected at the voltage –U to $SR_1$, $SR_2$, $SR_3$ and $SR_4$. For $M_{21}$ transistor $T_2$ ($M_{21}$) causes $C_1$ ($M_{21}$) to take over the negative charge of $C_2$ ($SR_1$) at a –U voltage in the signals $\bar{B}$ and $\bar{E}$ while –2U is impressed on the drain electrode D of $T_2$ ($M_{21}$) when the capacitor $C_2$ ($SR_1$) is charged to –U. Subsequently the alternate –U and oV voltages in the signals B and $\bar{B}$ and in the signals E and $\bar{E}$ shift the charges across the capacitors $C_2$ and $C_1$ in the store M. Shifting is effected during the period $T_{VB}$ under the influence of the signal PS and during the period $T_{VS}$ by the signal H.

It follows from the foregoing that the sensor panel P is charged under the control of the signals A and $\bar{A}$ in which for a –U voltage in the signal A ($T_2$, ($P_{11}$) is then, for example, conducting) oV must occur in the signal B. The capacitors $C_1$ and $C_2$ in the sensor panel P are charged to the reference voltage –U under the influence of the signal PS during the period $T_{VB}$.

After some time all capacitors $C_1$ and $C_2$ in the sensor of FIG. 1 are charged to the reference voltage –U. A voltage –2U, –U is impressed by the –U, oV variation in the signal E on the gate electrode G of transistor $T_3$, which voltage also occurs at the output terminal Z and furthermore contains no information.

Under the influence of light L the photosensitive capacitors $C_1$ and $C_2$ of the sensor panel P can be discharged. Capacitors $C_1$ and $C_2$ in the store M and the converter SR maintain their reference voltage –U. During the period $T_{VS}$ o and –U volts is present in the signals A and $\bar{A}$, respectively. The transistors $T_2$ in the panel P are thereby cut off while transistors $T_1$ (P) can conduct, which is effected when the capacitors $C_2$ (P) tend to convey a lower voltage than –U under the influence of the incident light L. The result is that during the period $T_{VS}$ and due to the –U voltage in the signal $\bar{A}$, the loss of charge caused by the incident light L in the capacitors $C_2$(P) is immediately augmented from the capacitors $C_1$ (P). It follows that for a maximum local intensity of the light L on both capacitors $C_1$ and $C_2$ of a sensor element $P_{11}$ . . . $P_{44}$ the reference voltage –U must be present at the capacitor $C_2$ while the capacitor $C_1$ is completely discharged.

The sensor panel P is read out as follows: During the field blanking period $T_{VB}$ four periods $T_p$ occur. During the first half of the first period $T_p$ there is no variation in the signal A (and $\bar{A}$) while that in the signal B (and $\bar{B}$) switches on the transistor $T_1$ (M) as a switch without further influence. During the second half of the first period $T_p$ the signal A switches on the transistors $T_2$(P) by means of the voltage –U and the signal $\bar{B}$ switches on the transistors $T_2$(M); the signal B has no influence. However, the loss of charge caused by the light L in the capacitors $C_1$(P) is augmented through the transistors $T_2$(P) from the capacitors $C_2$(P) charged to the reference voltage –U of a subsequent element, while particularly for the elements $P_{11}$, $P_{12}$, $P_{13}$ and $P_{14}$ there applies that the capacitors $C_1$ receive a negative charge from the capacitors $C_2$ of the elements $M_{41}$, $M_{42}$, $M_{43}$ and $M_{44}$.

During the first half of the second period $T_p$ the loss of charge in the sensor elements $P_{11}$ . . . $P_{34}$ is passed on from the capacitors $C_2$ to $C_1$ while the sensor elements $P_{41}$ . . . $P_{44}$ do not convey any information. The same shift of information from the capacitors $C_2$ to $C_1$ is effected in the storage elements $M_{41}$, $M_{42}$, $M_{43}$ and $M_{44}$. During the second half of the second period $T_p$ a shift to a subsequent element is effected again. During the first half of the fourth period $T_p$ the original information from capacitor $C_1$ ($P_{11}$) is shifted to the capacitor $C_1$($M_{21}$), from $C_1$($P_{12}$) to $C_1$ ($M_{22}$) . . . , from $C_1$($P_{21}$) to $C_1$ ($M_{31}$) etc, while that of $C_1$($P_{41}$) is now present in $C_1$($P_{11}$) and of $C_1$($P_{42}$) is present in $C_1$($P_{12}$) etc. During the second half of the fourth period $T_p$ the voltage –U is present in both of the signal $\bar{B}$ and $\bar{E}$ so that the information in the capacitors $C_1$ ($M_{21}$),$C_1$($M_{22}$),$C_1$($M_{23}$) and $C_1$($M_{24}$) is shifted to the capacitors $C_2$($SR_1$), $C_2$($SR_2$), $C_2(SR_3)$ and $C_2(SR_4)$. Although the transistors $T_2$ (SR) are switched on by the signal E, this has no further influence because the capacitors $C_1(SR)$ convey the reference voltage −U. The result is that the charge losses caused by the light L in the capacitors $C_1$ (P) are transferred to the capacitors $C_2$ (SR) and $C_2(M)$ while all capacitors $C_1(P)$ and $C_2(P)$ convey the reference voltage −U.

At the commencement of the field scan period $T_{VS}$ the voltages −U and oV occur in the signals B and $\bar{B}$, respectively, so that the transistors $T_2(M)$ are cut off and $T_1(M)$ are switched on during the line scan period $T_{HS}$ of the first period $T_H$. In the elements of the store M the information, i.e. the loss of charge of capacitors $C_2$ (M) is transferred to $C_1(M)$. Four clock pulses CS of high frequency having a period of $T_C$ are applied to the converter SR during this period $T_{HS}$ through the signals E and $\bar{E}$. During the first half of the first period $T_C$ the transistors $T_1(SR)$ are switched on by the −U voltage in the signal E. In the first instance the voltage −2U is impressed on the gate electrode G of transistor $T_3$ after this switching on, but this voltage rapidly decreases to a less negative value which is dependent on the negative charge which flows from capacitor $C_1(SR_1)$ to $C_2(SR_2)$ so as to augment the loss of charge in this capacitor, which loss is a measure of the light L incident on the capacitors $C_1(P_{11})$ and $C_2(P_{11})$. The information is transferred from the capacitors $C_2$ to $C_1$ in the elements $SR_2$, $SR_3$ and $SR_4$.

During the second half of the first period $T_C$ the transistors $T_2(SR)$ are switched on with the aid of the signal $\bar{E}$. The capacitors $C_1(SR)$ are then charged to the reference voltage −U and the capacitors $C_2(SR)$ subsequently convey the information. A voltage which is at first less negative and rapidly increases to the reference voltage −U is impressed on the gate electrode G of transistor $T_3$ and hence on the output terminal Z.

The previous process is repeated during the subsequent three periods $T_C$ and the result is that the information originating from the sensor elements $P_{11}$, $P_{12}$, $P_{13}$ and $P_{14}$ appears at the output terminal Z during the period $T_{HS}$ of the first line period $T_H$.

During the line blanking period $T_{HB}$ of the first line period $T_H$ the voltage −U is present in the signal $\bar{E}$ and is also present in the signal $\bar{B}$. The result is that during the period $T_{HB}$ the information present in the capacitors $C_1(M)$ of the elements $M_{31} \ldots M_{34}$ and $M_{41} \ldots M_{44}$ is shifted to the capacitors $C_2$ in the elements $M_{21} \ldots M_{24}$ and $M_{31} \ldots M_{34}$, while that of the elements $M_{21} \ldots M_{24}$ is transferred to the capacitors $C_2$ of the elements $SR_1 \ldots SR_4$. Prior to the commencement of the second line period $T_H$ the converter SR contains the information originating from the sensor elements $P_{21}$, $P_{22}$, $P_{23}$ and $P_{24}$. The description of the first line period $T_H$ equally applies to the subsequent three line periods $T_H$. For the fourth line period $T_H$, however, the line blanking period $T_{HB}$ is not used for shifting because the store M does not contain any information. This extra period and that of the first half of the first period $T_p$ have been introduced in order to obtain an integral number of lines of period $T_H$ during the cycle of period $T_V$.

A cycle has been described in the foregoing for a sensor panel P in a television system employing six lines per raster each having four spots while two lines occur during the field blanking period $T_{VB}$. Such a system is given for the sake of simplicity and many other ratios between line and field periods and field, scanning and blanking periods are possible. Interlacing has not been considered either. An image which is interlaced upon display and is built up from fields could be generated with a sensor panel P which is formed in duplicate with one part providing the information for the even lines and the other part providing the information for the odd lines.

Principally it is found that the sensor panel P is read out during the field blanking period $T_{VB}$ and not during the period $T_{VS}$ which field scan period is much longer in practical television systems than the period $T_{VB}$. The store M receives the information from the sensor panel P during the field blanking period $T_{VB}$ while it is read out line after instantaneous line during the period $T_{VS}$ within the line blanking periods $T_{HB}$. The parallel-series converter SR receives during the period $T_{VS}$ within one line blanking period $T_{HB}$ the information from a line in an instantaneous manner (parallel) from the store M while reading out is effected at a high frequency in series during a subsequent line scan period $T_{HS}$ so that the spot information appears sequentially in each line at the output terminal Z of the sensor according to FIG. 1.

It has been achieved that the sensor panel P within one cycle takes up information during a long period and is read out during a relatively short period while the store M maintains information during this long period and makes it available for the converter SR which is read out at a high frequency.

The advantages of the sensor according to FIG. 1 are apparent from a comparison with a previously proposed embodiment.

In a proposed embodiment of a sensor without the column structure shown in FIG. 1 of the sensor panel P and without the use of the store M and the converter SR, but with the use of a sensor panel having a line structure each line thereof would have to be read out per spot, i.e. at a high frequency. The line-structured panel would then be composed in such a manner that the row $P_{11}$, $P_{21}$, $P_{31}$, $P_{41}$ of FIG. 1 would be in the place of the sensor elements $P_{11}$, $P_{12}$, $P_{13}$, $P_{14}$; and likewise $P_{12}$, $P_{22}$, $P_{32}$, $P_{42}$ would be at the place of $P_{21}$, $P_{22}$, $P_{23}$, $P_{24}$ etc. The high-frequency reading out of the lines would then be effected in such a manner that each line of the sensor panel would be present at an output stage during a further line scan period while the light information continues to act on the sensor elements during the entire reading period. The sensor elements thus have the function of both picking up and shifting the information at the spot frequency. A certain extent of crosstalk follows from this dual function and to reduce this crosstalk the information-read period must be much shorter than the information pick-up period. Consequently, the spot-reading frequency is high.

The output stage of the known embodiment is alternately connected during one line period to one of the said lines of the panel. This stage is coupled through parasitic capacitances to all other lines so that a highly attenuated output signal having a poor signal-to-noise ratio is the result.

An additional shift register is required for changing over the output stage from one line to the other.

The high value of the spot-reading frequency in a desired embodiment of the sensor panel integrated in a semiconductor body creates difficulties due to requirements which are contradictory for a desired configuration of the sensor elements in connection with spot format and reading rate.

The sensor according to FIG. 1 prevents the use of the criticized output stage and shift register while a separation of the pick-up and read function makes a lower read frequency possible; the following may serve for explanation:

In a practical interlaced television system employing 625 or 525 lines per raster and hence 312.5 or 262.5 lines per field at a field frequency of 50 or 60 Hz, approximately 20 line periods, i.e. approximately 7 % of a field period for the field blanking period ($T_{VB}$) and approximately 18% of a line period for the line blanking period ($T_{HB}$) has been laid down in a standard. Assuming that a field includes $q$ lines ($T_V = qT_H$) and each line includes $q$ spots ($T_H = q\ T_C$) the result is a reading frequency of $q/T_H$ for the criticized embodiment of the sensor panel. For the sensor panel P of FIG. 1 there follows a reading frequency of $$q/T_{VB} = q/0.07\ T_v = q/_{0.07}\ qT_H\ \mathbf{16}/T_H.$$

A comparison of $q$ which at an average is equal to 285 and the factor of 16 shows that the reading frequency of the sensor panel P of FIG. 1 is reduced by a factor of 18 relative to the criticized embodiment.

In addition to the embodiment shown in FIG. 1 of a sensor suitable for television and provided with a two-dimensionally operative sensor panel P and adapted store M the sensor may alternatively be formed in one dimension in which there is no store M required. The elements $SR_1$, $SR_2$, $SR_3$ and $SR_4$ of the parallel-series converter SR are directly connected to the transistors $T_2$ in the sensor elements $P_{11}$, $P_{12}$, $P_{13}$ and $P_{14}$ each of which only include a capacitor $C_1$. The control lead at which the signal $\bar{A}$ is indicated is connected to ground while the switching voltage varying between –U and o volt occurs at the control lead with the signal A. After the information of the physical pattern has acted on the capacitors $C_1$ charged to the reference voltage –U, the transistors, $T_2$ of the sensor elements $P_{11}$, $P_{12}$, $P_{13}$, $P_{14}$ are switched on and the information corresponding to the charge loss is passed on to the capacitors $C_2$ of the parallel-series converter SR. In the manner described the converter SR is read out at a desired reading rate to the output terminal Z while for transistor $T_2$(P) being cut off the information of the physical pattern acts on the sensor elements $P_{11}$ . . . $P_{14}$.

The separation between the pick-up and read function in the one-dimensional embodiment of the sensor has the result that crosstalk between the sensor elements is prevented. The ratio between pick-up period and read period which is to be chosen to be as large as possible during the series reading of the sensor elements $P_{11}$ . . . $P_{14}$ so as to obtain the smallest possible crosstalk is of no importance due to this separation of functions.

Character recognition is mentioned as an example as a field of application for the one-dimensional embodiment of the sensor. Instead of the optical pattern also described with reference to the sensor according to FIG. 1, any other physical pattern, for example, differences in pressure may act on the sensor elements.

Figure 3:
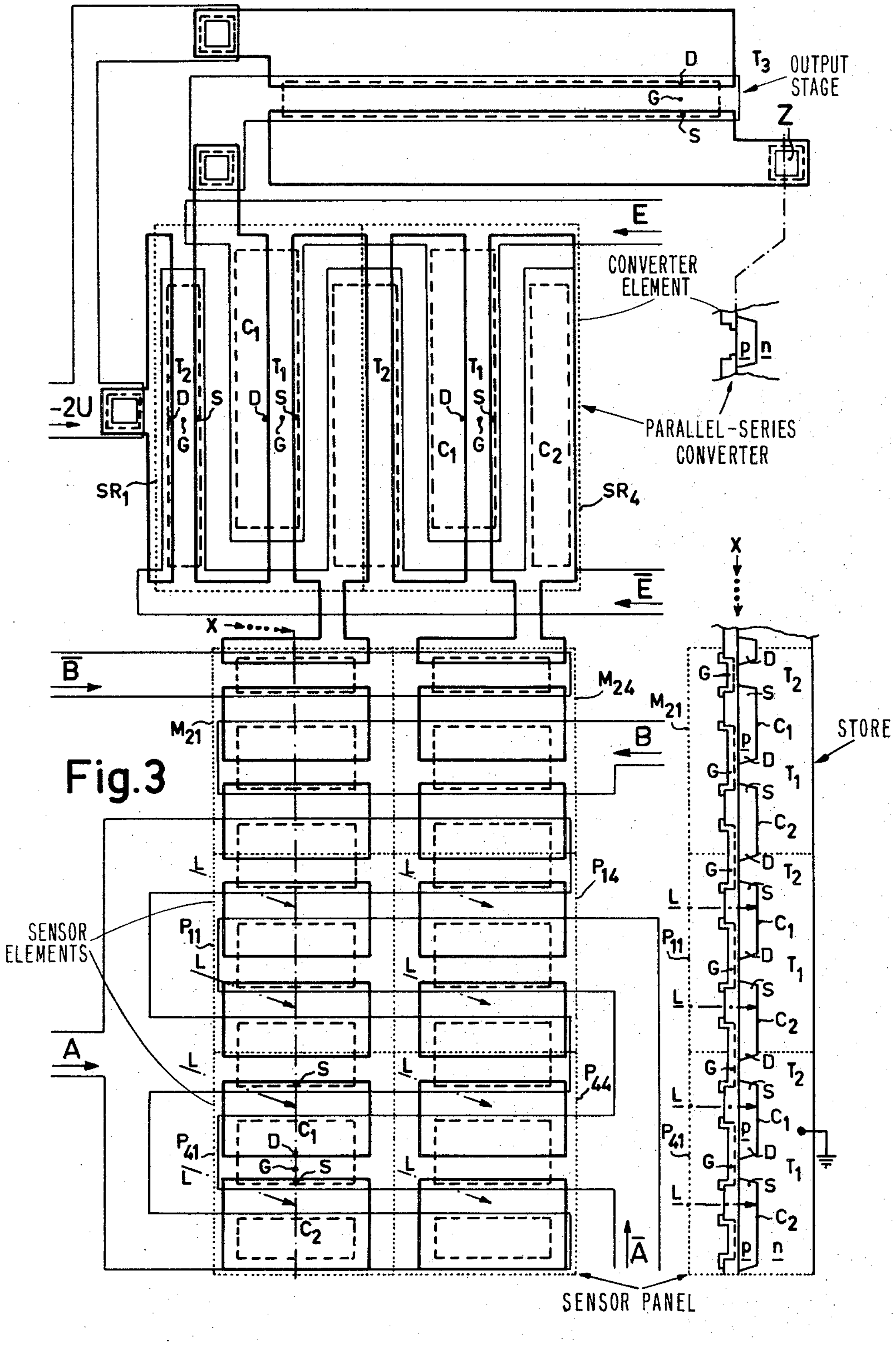

FIG. 3 diagrammatically shows a sensor which is integrated in a semiconductor body. Components and signals already described with reference to FIGS. 1 and 2 have the same reference numerals in FIG. 3. For the sake of simplicity the two-dimensional sensor having two by two sensor elements $P_{11}$, $P_{14}$ and $P_{41}$, $P_{44}$ is shown. Associated therewith is a store built up from two storage elements $M_{12}$ and $M_{24}$ which are connected to the elements $P_{11}$ and $P_{14}$. The parallel-series converter consists of two elements $SR_1$ and $SR_4$ which are connected in parallel with the storage elements $M_{21}$ and $M_{24}$ and in series with the output transistor $T_3$. The output terminal Z provides the output signal across a resistor not shown to ground ($R_3$ in FIG. 1).

DESCRIPTION OF THE PREFERRED EMBODIMENT

The sensor according to FIG. 3 may be formed with the aid of the generally used etching and diffusion techniques as described in Handbooks. The reference X denotes a cross-section of the semiconductor body consisting of $n$-material and is furthermore shown in a plan view. By etching and diffusion islands of $p$-material are formed in the $n$-substrate connected to ground. An electrically insulating transparent oxide layer of so-called silicon glass is provided across the body of $n$-material with the $p$-islands, which layer is partly thin, denoted by broken lines, and thick. Opaque aluminium strips are provided on the thin oxide layer.

In the plan view the aluminium strips are shown in, thin lines with the indication of the signals applied thereto such as A, B and E and the inverse values thereof, and the supply voltage –2U. The $p$-islands are shown in fat lines and only the thin regions denoted by solid lines of the oxide layer are shown. For the purpose of clarification broken lines bound the elements $P_{11}$ . . . $P_{44}$, $M_{21}$, $M_{24}$, $SR_1$ and $SR_4$. The light L is incident on the sensor elements $P_{11}$, $P_{14}$, $P_{41}$ and $P_{44}$ which light passes through the thick transparent oxide layer and penetrates the barrier layer between the $p$-island and the $n$-substrate. No light must be incident on the elements $M_{21}$, $M_{24}$, $SR_1$, $SR_4$ and transistor $T_3$ so that these are shielded and are coated, for example, with a layer of aluminium which is provided locally and is insulated through an oxide layer.

The MOS transistors $T_1$ and $T_2$ are shown in the cross-section X. Reference G denotes the gate electrodes of aluminium. The reference S and D denote the source and the drain of transistors $T_1$ and $T_2$; it appears that these are not provided with electrodes so that one side of a $p$ island is active as drain D for one transistor and the other side is active as source S for the other transistor. The capacitors $C_1$ and $C_2$ are indicated at the barrier layer of the $p$-islands and the $n$-substrate. The light L is incident on a portion of this barrier layer which is constituted by a $p$-$n$ junction in the cut-off condition. The light L releases electrons with its photons in the barrier layer which electrons travel to the substrate connected to ground, while the remaining holes are displaced towards the $p$-island conveying a negative voltage. The voltage across the barrier layer therefore decreases and in this manner the photosensitive capacitor described with reference to FIG. 1 is obtained. This photosensitive capacitor, together with the capacitor of the rest of the barrier layer upon which the light L is not incident and the capacitor between the $p$-island and the overlapping part of the aluminium gate electrode G constitutes the capacitors $C_1$ and $C_2$ which are diagrammatically shown in FIG. 1 between the drain (electrode) D and the gate electrode G of transistors $T_1$ and $T_2$.

It is found that the boundary of the converter elements with the series-arranged components $C_2$, $T_1$, $C_1$, $T_2$ may alternatively be chosen with $T_1$, $C_1$, $T_2$, $C_2$. The choice made provides a simple connection possibility between the storage elements $M_{21} \ldots M_{24}$ and between the elements $SR_1 \ldots SR_4$.

FIG. 3 shows some connection areas between the supply voltage −2U and the drain D of transistors $T_2(SR_1)$ and $T_3$, between the drain D and transistor $T_1$ $(SR_1)$ with the capacitor $C_1$ and the gate electrode G of transistor $T_3$ and at the output terminal Z. A crossection is shown at Z for such a connection area. A *p*-island in the *n*-substrate is coated on a square recess with a thin rim-like and furthermore thick insulating oxide layer. For electrical contact the recess may be filled up with an aluminium strip as is known for the other connection areas.

Due to the separation of functions between picking up the information and high-frequency reading out, the configuration can be chosen of the various elements $P_{11} \ldots P_{44}$, $M_{21}$, $M_{24}$ and $SR_1$, $SR_4$ and the output transistor $T_3$ adapted optimally to the function. Generally there applies that for fast switching the MOS transistors must be formed with large oblong islands in the semiconductor body as shown at $T_3$, $T_1(SR)$ and $T_2(SR)$. For the sensor elements $P_{11} \ldots P_{44}$ corresponding to the television spots, it is desired that these are made to be more or less square and as small as possible and are placed as closely as possible together; the associated storage elements $M_{21}$, $M_{24}$ may be formed in the same configuration. Without the separation of functions the configuration of the sensor elements would be a compromise between two optimum solutions.

The charge mechanism of the sensor is described hereinbefore, with reference to FIG. 1. The sensor according to FIG. 3 may be charged in a simpler manner by connecting the *n*-substrate for a short period to −U voltage when the sensor is switched on so that for a oV voltage on the gate electrodes G the capacitors $C_1$ and $C_2$ are charged to the reference voltage −U. After charging the substrate is to be connected to ground again and the sensor is ready for use. It is alternatively possible to maintain the substrate connected to ground during charging and to connect the gate electrodes G to a +U voltage while the capacitors $C_1$ and $C_2$ are charged through the p-n barrier layer active as a diode. After switching off the +U voltage the capacitors $C_1$ and $C_2$ remain charged to the voltage −U.

What is claimed is:

1. A sensor for converting a physical pattern into an electrical signal as a function of time, comprising a first plurality of rows of photo-sensitive charge storage means each having a photo-sensitive charge storage area and an associated control electrode for providing an electrical charge as a function of incident light thereon and for passing the charge in a predetermined direction to an adjacent charge storage area in response to a transfer signal on a corresponding control electrode, a second plurality of rows of charge storage means each having a charge storage area insensitive to light and an associated control electrode for storing electrical charges and for passing the stored charges in a predetermined direction to an adjacent charge storage area in response to a transfer signal on a corresponding control electrode, each row of the first plurality of charge storage areas being connected to the charge storage area on the end of a corresponding row of the second plurality of charge storage areas to which charge is passed, parallel series converter means connected to each row of the second plurality of rows of charge storage means for providing a serial electrical signal corresponding to the charges stored in the charge storage areas of the connected charge storage means in response to a converter signal, means connected to all the control electrodes of the photo-sensitive charge storage means in the first plurality of rows of photo-sensitive charge storage means and to all the control electrodes of the charge storage means in the second plurality of rows of charge storage means for providing a transfer signal having a first frequency, and means connected to the parallel-series converter means for providing a converter signal having a second frequency equal to *n* times the first frequency where *n* is a number greater than 2.

2. A sensor as claimed in claim 1, wherein each row in the second plurality of rows of charge storage means has one charge storage area less than the number of charge storage areas in each row of the first plurality of rows of photo-sensitive charge storage means.

3. A sensor as claimed in claim 1 for use in television equipment employing line and field frequency scanning and blanking periods, further comprising a line frequency switching voltage source, means connecting the control electrodes of the second plurality of rows of charge storage means to the line frequency switching voltage source, logic means for gating the transfer signal to the first and second plurality of rows of charge storage means in response to the field blanking period of the television equipment, and further logic means for gating the converter signal to the parallel-series converter in response to the line scan period within the field scan period of the television equipment.

4. A sensor as claimed in claim 1, wherein the means for providing the transfer signal and the means for providing the converter signal comprise a plurality of logic gates and dividers connected to a single oscillator.

5. A sensor for converting a physical pattern into an electrical signal as a function of time comprising a semiconductive wafer including a bulk portion of a first type semiconductivity, a first plurality of spaced localized zones of opposite type semiconductivity disposed adjacent and forming a plurality of series paths along the surface of the wafer, each of said zones forming with the bulk portion successive charge storage means whose charge condition is responsive to incident photons; a second plurality of spaced localized zones of said opposite type semiconductivity disposed adjacent and forming a plurality of series paths along the surface of the wafer each path formed by said second plurality of spaced localized zones being formed at one end of a corresponding path formed by said first plurality of spaced localized zones, each of said zones of said second plurality of localized zones forming with the bulk portion successive charge storage means, a dielectric layer disposed over said surface and over said first and second plurality of localized zones; a plurality of localized conductive electrodes disposed over the dielectric layer and registered with said first plurality of localized zones such that each of said conductive electrodes extends over the space between an adjacent pair of said zones and over a portion of one zone of the pair of zones; a second plurality of localized conductive electrodes disposed over the dielectric layer and registering with said zones of said second plurality of localized zones such that each of the said conductive electrodes extends over a space between a pair of said zones of said second plurality of localized zones and over a portion of one zone of the pair of zones of the second plurality of zones, a localized conductive electrode disposed over the dielectric layer and registering with the localized zones of the first plurality of localized zones adjacent the localized zone of the second plurality of localized zones and extending over the space between the adjacent pairs of zones of the first and second plurality of localized zones; means for applying a pair of clock voltages alternately to successive ones of said electrodes of the first and second plurality of electrodes, said pair of voltages being sufficient to produce in the localized zones of said first and second plurality of localized zones a steady state deficiency of carriers and said pair of voltages additionally being such that their successive application to the electrodes is sufficient to cause the advance of a packet of charge from one zone to the next zone along the series paths at each alternation of the voltages in a direction from the first plurality of localized zones toward the second plurality of localized zones; means for enabling incident photons to impinge upon the successive charge storage means of said first plurality of localized zones to cause in response to the photon intensity at each charge storage means of said first plurality of localized zones a variation from the steady state deficiency level, said variation representing signal information corresponding to the photon intensity at each charge storage means of said first plurality of localized zones; a parallel-series converter connected to the ends of the series paths of the second plurality of localized zones remote from the first plurality of localized zones for converting the charge information at the ends of the series paths of the second plurality of localized zones remote from the first plurality of localized zones into a sequential series of voltage changes in response to a converter signal; and means for applying an alternating converter signal to the parallel-series converter at a frequency equal to $n$ times the frequency of the alternating clock voltages where $n$ is a number greater than two.

6. A sensor for converting a physical pattern into an electrical signal as a function of time, comprising a first plurality of photo-sensitive charge storage means arranged in a row, each photo-sensitive charge storage means having a photo-sensitive charge storage area and an associated control electrode for providing an electrical charge as a function of incident light thereon and for passing the charge in a predetermined direction to an adjacent charge storage area in response to a transfer signal on a corresponding control electrode, a second plurality of charge storage means arranged in a row, each of the second plurality of charge storage means having a charge storage area insensitive to light and an associated control electrode for storing electrical charges and for passing the stored charges in a predetermined direction to an adjacent charge storage area in response to a transfer signal on a corresponding control electrode, the row of the first plurality of charge storage areas being connected to the charge storage area on the end of the row of the second plurality of charge storage areas to which charge is passed, converter means connected to the row of the second plurality of charge storage means for providing a serial electrical signal corresponding to the charges stored in the charge storage areas of the connected charge storage means in response to a converter signal, means connected to all the control electrodes of the photosensitive charge storage means in the row of the first plurality of photosensitive charge storage means and to all the control electrodes of the charge storage means in the row of the second plurality of charge storage means for providing a transfer signal having a first frequency, and means connected to the converter means for providing a converter signal having a second frequency equal to $n$ times the first frequency where $n$ is a number greater than 2.

7. A sensor for converting a physical pattern into an electrical signal as a function of time comprising a semiconductive wafer including a bulk portion of a first type semiconductivity, a first plurality of spaced localized zones of opposite type semiconductivity disposed adjacent and forming a series path along the surface of the wafer, each of said zones forming with the bulk portion successive charge storage means whose charge condition is responsive to incident photons; a second plurality of spaced localized zones of said opposite type semiconductivity disposed adjacent and forming a series path along the surface of the wafer, each path formed by said second plurality of spaced localized zones being formed at one end of a corresponding path formed by said first plurality of spaced localized zones, each of said zones of said second plurality of localized zones forming with the bulk portion successive charge storage means; a dielectric layer disposed over said surface and over said first and second plurality of localized zones; a plurality of localized conductive electrodes disposed over the dielectric layer and registered with said first plurality of localized zones such that each of said conductive electrodes extends over the space between an adjacent pair of said zones and over a portion of one zone of the pair of zones; a second plurality of localized conductive electrodes disposed over the dielectric layer and registering with said zones of said second plurality of localized zones such that each of the said conductive electrodes extends over a space between a pair of said zones of said second plurality of localized zones and over a portion of one zone of the pair of zones of the second plurality of zones, localized conductive electrode disposed over the dielectric layer and registering with the localized zones of the first plurality of localized zones adjacent the localized zones of the second plurality of localized zones and extending over the space between the adjacent pairs of zones of the first and second plurality of localized zones; means for applying a pair of clock voltages alternately to successive ones of said electrodes of the first and second plurality of electrodes, said pair of voltages being sufficient to produce in the localized zones of said first and second plurality of localized zones a steady state deficiency of carriers and said pair of voltages additionally being such that their successive application to the electrodes is sufficient to cause the advance of a packet of charge from one zone to the next zone along the series paths at each alternation of the voltages in a direction from the first plurality of localized zones toward the second plurality of localized zones and means for enabling incident photons to impinge upon the successive charge storage means of said first plurality of localized zones to cause in response to the photon intensity at each charge storage means of said first plurality of localized zones a variation from the steady state deficiency level, said variation representing signal information corresponding to the photon intensity at each charge storage means of said first plurality of localized zones.

* * * * *

PO-1050
(5/69)

UNITED STATES PATENT OFFICE
CERTIFICATE OF CORRECTION

Patent No. 3,824,337 Dated July 16, 1974

Inventor(s) FREDERIK LEONARD JOHAN SANGSTER and HENDRIK HEIJNS

It is certified that error appears in the above-identified patent and that said Letters Patent are hereby corrected as shown below:

ON THE TITLE PAGE

Section [75] Inventors "Frederik Leonard John Sangster" should read --Frederik Leonard Johan Sangster--;

Insert where appropriate

IN THE SPECIFICATION

Col. 2, line 18, after "ter" insert --in an integrated circuit--;

Col. 7, line 47, "$M_{31}\cdots M_{34}$" should read --$M_{31}\cdots\cdots M_{34}$--;

IN THE CLAIMS

Claim 7, line 32, before "localized" insert --a--;

Signed and sealed this 22nd day of April 1975.

(SEAL)
Attest:

RUTH C. MASON
Attesting Officer

C. MARSHALL DANN
Commissioner of Patents
and Trademarks